Sept. 10, 1935.　　　　　J. P. BRYAN　　　　　2,014,101

EMERGENCY GENERATING SET

Filed Oct. 22, 1930　　　5 Sheets-Sheet 2

FIG. 2

INVENTOR
J. P. Bryan
BY
Thomas How ATTORNEY

Sept. 10, 1935.　　　　J. P. BRYAN　　　　2,014,101
EMERGENCY GENERATING SET
Filed Oct. 22, 1930　　　5 Sheets-Sheet 3

Sept. 10, 1935.  J. P. BRYAN  2,014,101
EMERGENCY GENERATING SET
Filed Oct. 22, 1930  5 Sheets-Sheet 4

J. P. Bryan INVENTOR
BY
Thomas Howe ATTORNEY

Sept. 10, 1935.　　　　　J. P. BRYAN　　　　　2,014,101
EMERGENCY GENERATING SET
Filed Oct. 22, 1930　　　5 Sheets-Sheet 5
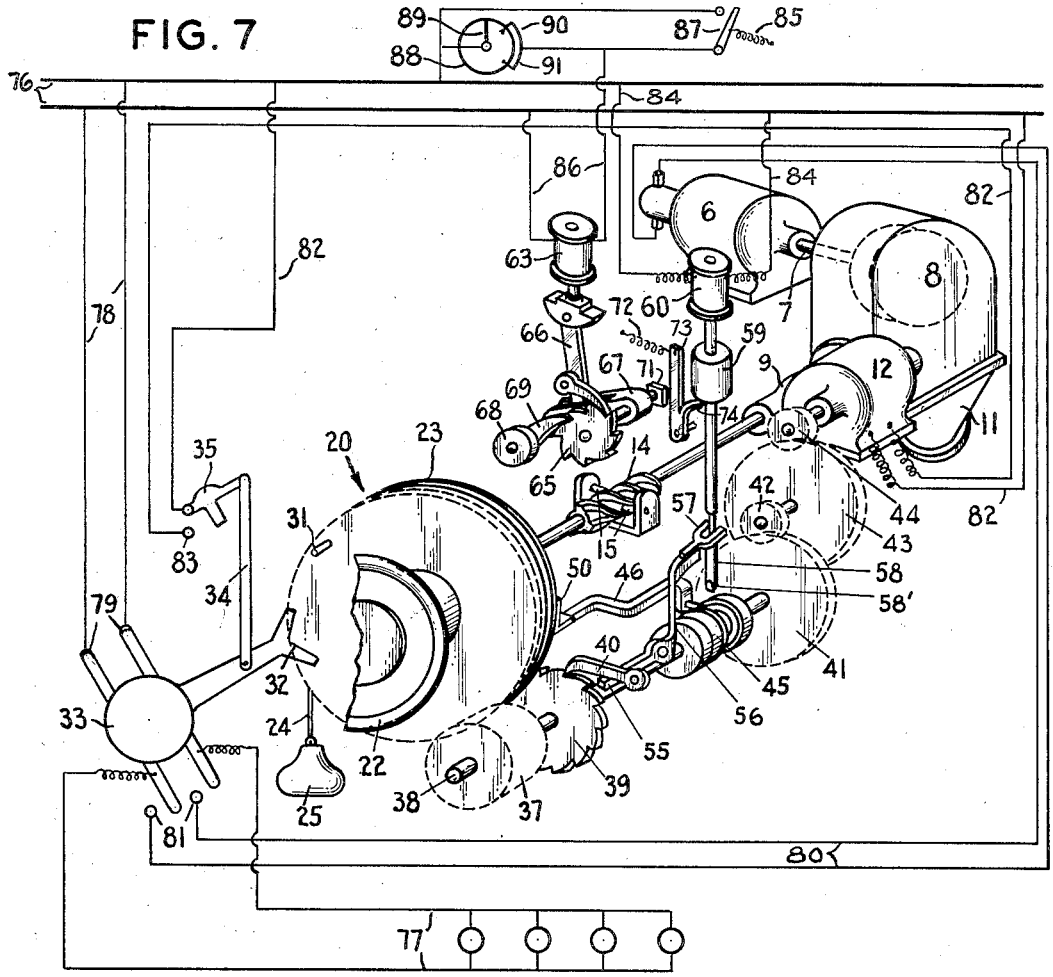
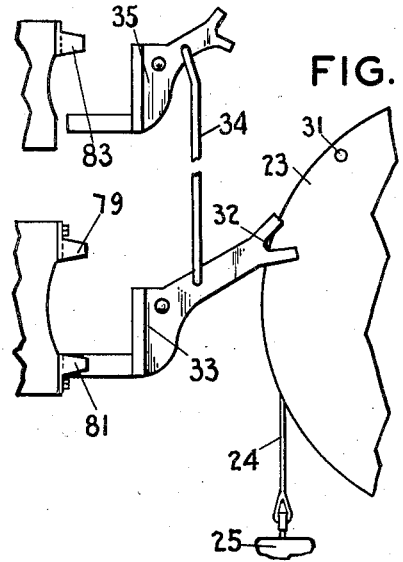
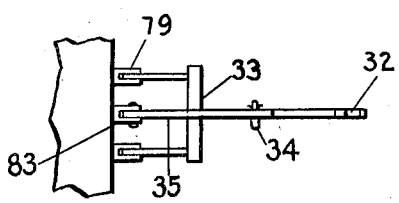
INVENTOR
J. P. Bryan
BY
Thomas Howe ATTORNEY Patented Sept. 10, 1935

2,014,101

UNITED STATES PATENT OFFICE 2,014,101

EMERGENCY GENERATING SET

Joseph P. Bryan, Troy, Pa.

Application October 22, 1930, Serial No. 490,370

13 Claims. (Cl. 290—7)

This invention relates to emergency electric generating sets.

In many instances it is desirable and even necessary that an auxiliary or emergency electric generating set be in readiness to supply current when the main source of electricity fails for any reason. As an instance of this, the lights in moving picture theatres and other places of public gathering are usually lighted from the supply mains of the city, which mains are usually laid along the streets and receive their electricity from a central generating station. If such a source of supply of electricity to the theatre or other place of public gathering were discontinued because of failure at the central station, disconnection or failure of the supply lines, or for other causes, the place of gathering would be left in darkness. In case of fire the supply lines are apt to be disconnected by the ravages of fire or by the action of the firemen. In some localities it is a rule that the first duty of the firemen on reaching a fire is to disconnect all connections of the fired building with the electric supply mains. This, of course, extinguishes all the electric lights in the building including the exit lights and in time of fire, the people, left in darkness, not knowing which way to turn, are likely to become involved in a panic with consequent disaster. Many actual occurrences have taken place where in large numbers of people have been seriously injured and even killed because of failure of the lights in time of fire.

Emergency lighting sets utilizing the water power of the usual water mains in the building where the set is located for driving a waterwheel directly connected to a generator supplying the current for the lights, have been extensively used in practice and have given satisfactory service.

In such sets the water-wheel for driving the generator has been controlled by a valve operated in response to current in the main supply lines.

In another application I have set forth an emergency set of the character indicated wherein actuating means for the valve, and also for switching mechanism, "runs down" and requires to be rewound or reset before it can again operate. In the application referred to, this rewinding or resetting is manually accomplished.

It is one of the main objects of the present invention to provide for the rewinding or resetting of the valve operating means by mechanism rather than by hand.

It is a further object of the invention to provide automatic mechanism for rewinding or resetting the valve operating mechanism.

A further object of the invention is to provide a fully automatic emergency generating set which may be locked against operation and the locking means be remotely controlled.

A further object of the invention is to provide a timing mechanism for automatically testing out the set simulating current failure in the main line, and operating the set for a pre-arranged period, at the end of which time stopping the test, and leaving it in an operative condition.

Other and ancillary objects of the invention will appear hereinafter.

In the accompanying drawings which illustrate the invention—

Fig. 2 is a front elevation of the said apparatus, certain parts being in section, showing the operating mechanism and parts of the control;

Fig. 5 is an enlarged plan view of the consumption circuit connecting switch and the motor circuit connecting switch;

Fig. 6 is a side elevation of the switches shown in Fig. 5 and their operating mechanism, the latter being broken away; and Fig. 7 is a diagrammatic view showing a wiring diagram and the relation of the parts.

Figure 1:
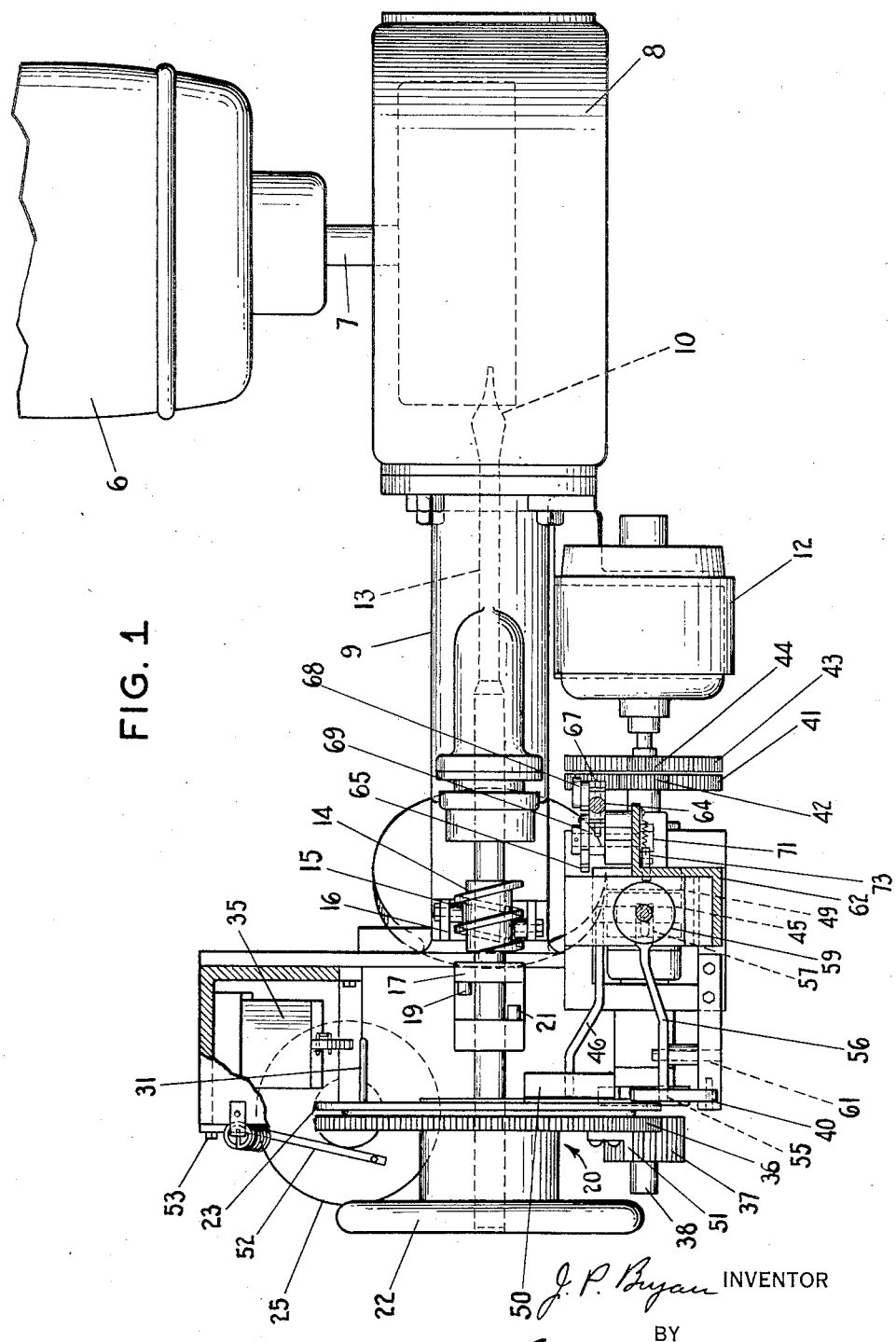
Fig. 1 is a plan of apparatus embodying the invention showing the arrangement of the generator, water-wheel, motor and parts of the controlling mechanism.

Referring to the drawings, 6 is a compound-wound, direct current generator, with suitable fixed resistances so as to deliver current at a constant voltage, within commercial limits, at all speeds and loads. On the shaft 7 of the generator is mounted a water-wheel 8 of the impulse type. The flow of water to the water-wheel through inlet 9, is controlled by the needle valve 10, and discharges through the outlet 11. When the needle valve is open the water wheel drives the generator.

On the valve stem 13 of the needle valve is secured the worm 14, which engages with the rollers 15, mounted in the fixed brackets 16, secured to the casing of the inlet 9, and more clearly shown in Fig. 1. When the valve stem 13 is turned, it is moved in the direction of its axis by the action of the worm and the rollers.

Figure 3:
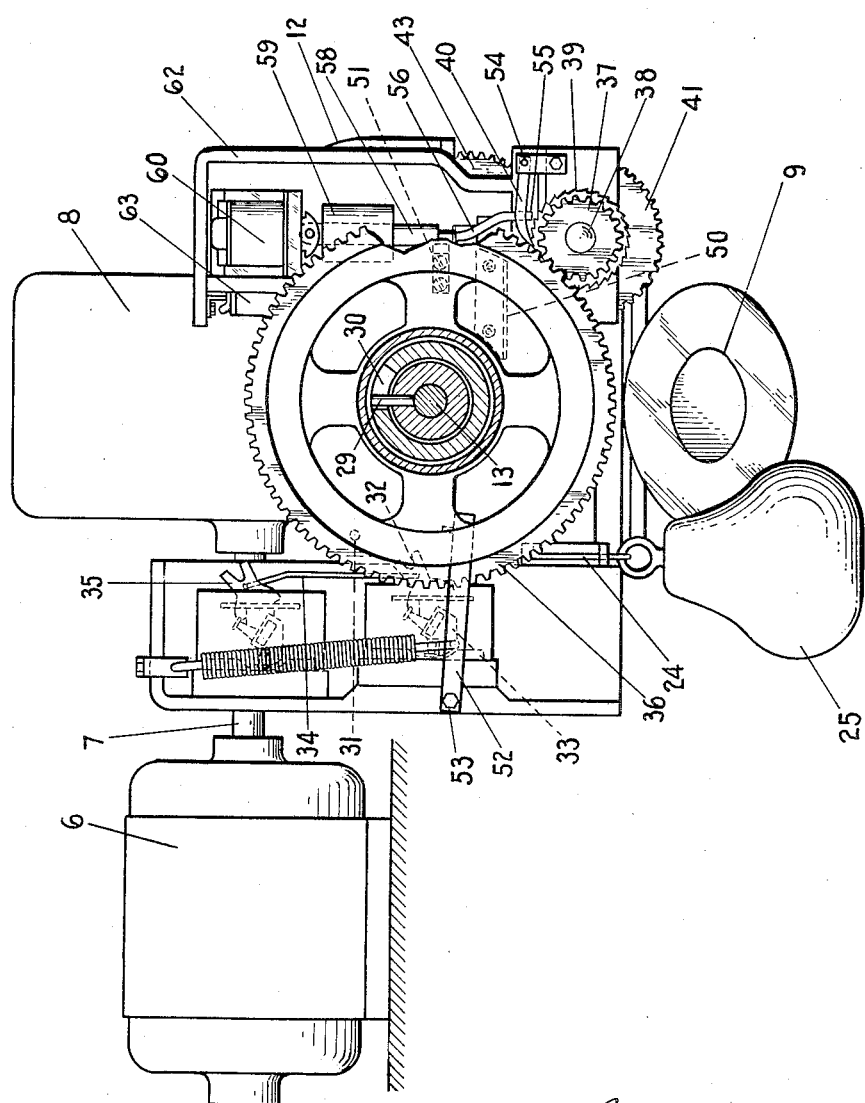
Fig. 3 is an end elevation of the said apparatus viewed from the left of Fig. 1, partly broken away, showing the pulley wheel, motor, gears and weight.

At 17 is an adjustable stop collar held on the valve stem 13 by the set screw 18. This collar carries the stop pin 19, which abuts the pin 21, fixed to the bracket 16 on the frame, at the end of the movement of the valve stem. The adjustment of this stop collar 17 controls the opening of the needle valve. On the end of the needle valve stem 13 is fixed the drum 20, which includes the hand wheel 22, for manually operating the needle valve. A grooved pulley 23 is fixed on the periphery of the drum 20. Attached to the pulley 23 and fitting in a groove thereof is a flexible cable 24 to which is attached the weight 25. The action of this weight in falling when released by a solenoid controlled mechanism, hereinafter described, turns the pulley, drum and the valve stem 13 opening the needle valve. Within the hand wheel 22 and fitting over a hub 26 on the drum 20 is the collar 27, which is secured to the valve stem 13 by the set-screws 28. In the hub 26 of the drum there is mounted the pin 29 which projects into a sector 30 cut out of the collar 27. As shown in Fig. 3 this cutout sector 30 permits the pin 29 free play when it is in this sector allowing the drum 20 to revolve free from the valve stem 13. This permits the drum to gather momentum under influence of the falling weight, and imparts a sufficient blow or shock when pin 29 strikes the side of the sector 30 on the collar 27 to revolve the stem and prevent sticking of the needle valve. Referring to Figs. 1 and 3 the pin 31, projects from the side of the pulley 23, and upon rotation of the drum, with release of the weight, engages the jaw 32 (Fig. 3) on the double-throw, double-pole switch 33, throwing it and disconnecting the consumption circuit from the main-line and connecting it to the generator terminals as hereinafter described.

Tied to the switch 33 by the arm 34 and operated simultaneously by it, is the single-pole, double-throw switch 35, which connects and disconnects the electric motor 12 from the main line as is hereinafter described.

Referring to Fig. 2 and the pulley 23, the rim of this pulley is fitted with gear teeth 36 which engage the pinion 37 secured to one end of the shaft 38. Fixed to this shaft is the ratchet-wheel 39, which engages a ratchet-finger 40. This finger 40 by its engagement with the ratchet-wheel 39 prevents the shaft 38 from turning, and therefore the pulley 23. On the other end of the shaft 38, is mounted the gear wheel 41, which is driven by the gear-train 42, 43, 44 and the motor 12. This motor is driven by the main line current, winds up the weight 25 and closes the needle valve 10. In the middle of the shaft 38 is the spring clutch 45, and operating lever 46, shown pivoted at 47. The clutch lever roller is shown at 48 and the clutch springs at 49. This clutch is used to detachably connect the motor end of the shaft 38 after the cable carrying the weight 25 has been wound up on the pulley 23 by the motor 12. The clutch 45 is thrown out of engagement against the action of the springs 49 by the projection 50 on the pulley wheel 23, which acts on the end of the lever 46 depressing it, during the last revolution of the pulley when the weight is being wound up by the motor. This disconnects the motor from the shaft 38, and allows the weight 25 when released, to turn the pulley wheel 23, pinion 37 and shaft 38 free from the motor 12. Simultaneously with the release of the weight 25, the projection 58' on the end of the solenoid rod 58 (Fig. 2), here-inafter described, drops in between the two disks (now open) of the clutch 45 and holds them apart until the solenoid rod 58 is raised by the energizing of solenoid 60. With the removal of the projection 58', the disks of the clutch 45 are forced together by the action of the clutch springs 49, so that the motor is connected to the weight end of the shaft 38 and ready to wind up the weight as soon as the motor is energized by the main line current. The revolution of the drum 20, due to the falling weight, is stopped by the piece 51, fixed to the drum, and the spring supported lever 52, which is pivoted to the switch bracket at 53.

The weight 25 is free to fall when the pulley 23, pinion 37, are allowed to turn by releasing the ratchet wheel 39. This ratchet wheel is released by the ratchet-finger 40, pivoted at 54, and supported by an arm 55 on one end of the lever 56. The other end 57 of this lever 56 engages with a rod 58 carrying a weight 59, this rod being pivoted to the plunger of the solenoid 60. The lever 56 is pivoted at 61, so that when the end 57 is depressed, the other end 55 is raised, lifting the ratchet finger 40 and freeing the ratchet wheel 39. The solenoid 60 carried by the solenoid bracket 62 is energized by the main line current, so that when it is deenergized, due to failure or interruption of the main line current, the weight 59 falls. The lower end of rod 58 has a wedge-shaped portion 58' which is adapted in its lowered position to fit in between the two disks of the clutch 45, when they have been separated by the action of projection 50, carried by the pulley 23, on the clutch lever 46. The clutch 45 is thus out or disconnected while the part 58' is between the disks of the clutch.

Figure 4:
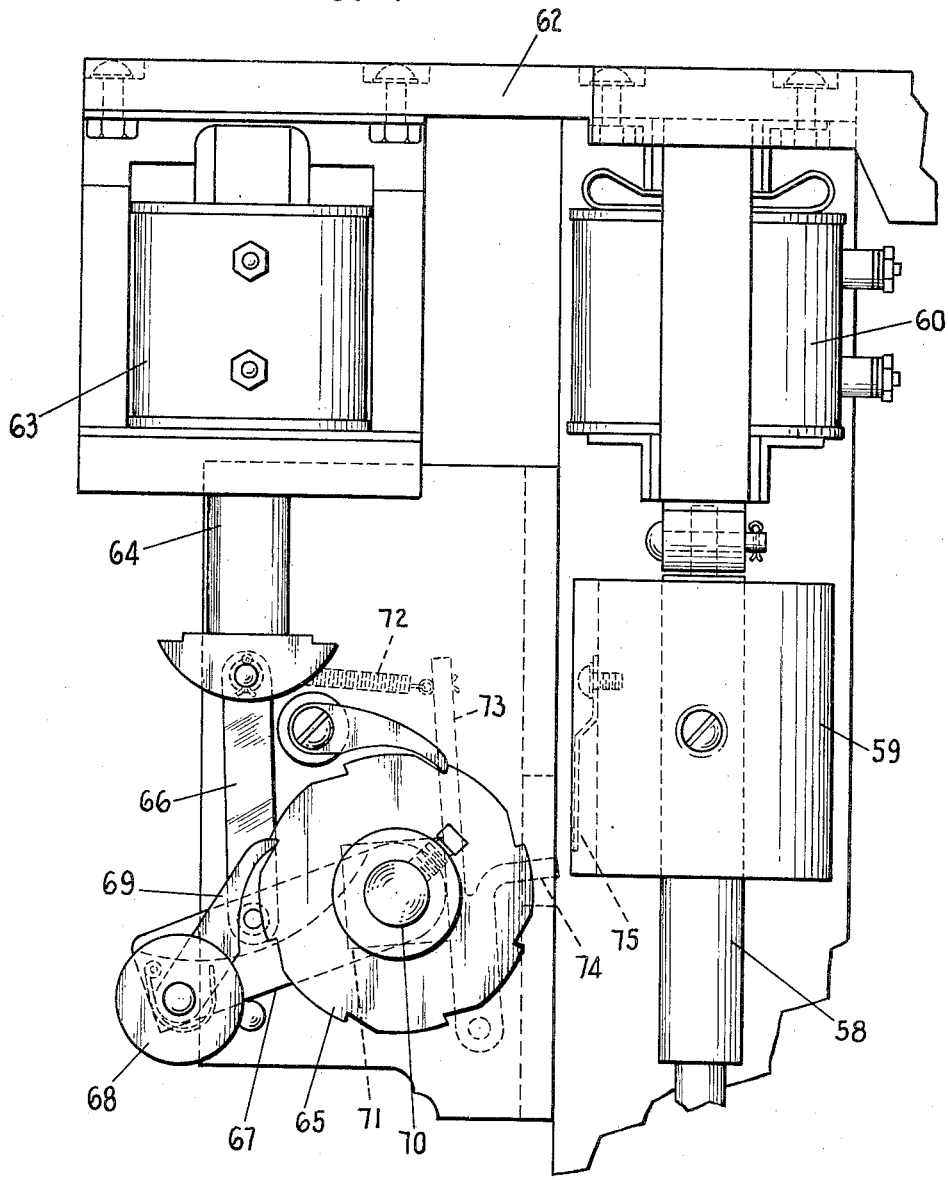
Fig. 4 is an enlarged side elevation of the two solenoids and the locking mechanism.

Referring to Figs. 2 and 4, the solenoid 63 is supported by the bracket 62 and is energized by the main line current through a remote control switch. The armature 64 of this solenoid operates the ratchet wheel 65 by the lever 66, arm 67 which carries the weight 68, and pawl 69. On the shaft 70 which carries the ratchet-wheel 65 is a square cam 71, against which there is retained by the action of a spiral spring 72, the latch 73 which has a projection 74. The projection 74 has two positions, one in the path of the weight 59 of the solenoid 60 to prevent it from falling, and the other position which is clear of the weight 59, allowing the weight to fall. By operating a remote control switch and energizing the solenoid 63, the ratchet wheel 65 is turned a tooth, which is sufficient to place the latch 73 so that its projection 74 is in the path of the moving weight 59, permitting the projection 74 to engage with the catch 75 on the weight 59, thereby preventing it from falling. The set can thus be locked and made inoperative by remote control. In the same manner another energizing of the solenoid 63 unlocks the set.

The operation may be traced as follows:

Referring to Fig. 7, 76 is the direct current main line which supplies current to the consumption circuit 77 through the leads 78, contacts 79, and double-pole, double-throw switch 33. The water-wheel generator 6 supplies current through the leads 80 on the contacts 81. The weight-winding motor 12 is energized by the main line current 76 through the leads 82, contact 83 and switch 35. The solenoid 60 for putting the starting mechanism into operation is energized by the main line current 76 through the leads 84. The solenoid 63 for operating the remote controlled locking mechanism, for locking the set in an inoperative position, is energized by the main line current 76 through the leads 86, clock switch 88 and the remote control switch 87. With the current on the main line, set unlocked, and needle valve closed, when the current in the main line 76 fails, the solenoid 60 is deenergized, the weight 59 drops depressing the end 57 of the lever 56, and raising the other end 55. This raises the ratchet finger 40 and frees ratchet-wheel 39. The clutch 45 which connects the weight end of the shaft 38 to the motor driven end of the same shaft is thrown out of engagement against the action of the clutch-springs 49, by the projection 50 on the pulley wheel 23, bearing on the clutch operating lever 46. The clutch is out of engagement in the position of the diagram (Fig. 7). With the dropping of the solenoid weight 59 the wedge-shaped portion 58' of the rod 58 drops in between the disks (now open) of the clutch 45, and keeps them separated. The pulley wheel 23 is now free to turn under the influence of the weight 25 which now falls. The rotating pulley turns the valve stem 13, worm 14, and, as described hereinabove, moves the stem to the left and opens the needle valve 10, admitting water to the water-wheel 8 and driving the shaft 7 of the generator 6 which supplies current to the contacts 81. The turning of the pulley 25 raises the projection 50 relieving the pressure on the end of the clutch operating lever 46, and the clutch 45 is now ready for being thrown into engagement by the action of the clutch springs 49, upon removal of the part 58', connecting the motor driven sleeve on the shaft 38 to that shaft which is geared to the pulley-wheel and weight. When the pin 31 on the pulley wheel 23, during its revolution, strikes the jaw 32 of the double-pole, double-throw switch 33, this switch is thrown, disconnecting the consumption circuit 77 from the main line 76, and connecting it through the contacts 81 to the generator 6, which now supplies current. By this same movement and simultaneously with it, the switch 33, through the link arm 34, connects the switch 35 with contact 83, thus connecting motor 12 with the main line, now dead. When the solenoid 60, is energized, the rod 58 is raised carrying with it the wedge-shaped portion 58', which allows the clutch springs 49 to act and the clutch 45 is thrown in. The motor 12 is now so connected that upon the resumption of the main line current, it will function through the shaft 38 to turn the pulley 23 and wind up the weight 25. When the main line current in 76 is restored, energizing the solenoid 60, the weight 59 is raised, taking with it the end 57 of the lever 56, and dropping the other end 55. This allows the ratchet-finger 40 to engage with the teeth of the ratchet-wheel 39. With current in the main line 76, the motor 12 is energized and operates to turn the pulley-wheel 23 and winds up the weight 25 closing the valve 13 as hereinabove described. When the pin 31, on the pulley-wheel, already described, strikes the jaw 32, the switch 33 is disconnected from the contacts 81 and the consumption circuit 77 is connected up through the contacts 79 with the main line current. This movement of the switch 33 carries with it the switch 35, which disconnects the motor 12 from the main line. When the projection 50 strikes the end of the clutch operating lever 46, during the last part of the revolution of the pulley wheel, when the weight is being wound up, the clutch 45 is thrown out as hereinabove described.

From the foregoing it will be apparent that by closing and opening the switch 87, the solenoid 63 will be energized and deenergized, and the ratchet wheel 65 will be stepped up one step or tooth, which will be sufficient to move the projection or support 74 from its retracted position as shown (Fig. 7) to a position beneath the locking piece 75 where it will lock with it and prevent the solenoid weight 59 from falling. Similarly by closing the switch 87 again, the ratchet wheel 65 will be moved up another step, allowing the latch 73 to be pulled back by the action of the spring 72, thus restoring the support 74 to its retracted position, and unlocking the set. This switch 87 may be located at any desired or convenient point, remote or not, from which it is desired to control the locking and unlocking of the apparatus. The spring 85 normally holds the switch 87 open.

Under some circumstances it may be desired to automatically cause the apparatus to be locked during certain periods and unlocked during other periods. To accomplish this a clock mechanism 88 may be provided which has, upon the usual hour hand shaft a contact arm 89 adapted to pass over the contact 90, and also over the contact 91, the arm 89 contacting with the contacts 90 and 91 as it passes over them. It will be apparent that the contact arm 89 being mounted upon the hour hand shaft of the clock mechanism, its contact arm will move in the usual manner of the hour hand of a clock. The contact 90 is adjustable into any desired position in the path of the hour hand, and the contact 91 is likewise adjustable. The contact arm 89 is connected with one of the supply leads 76 while the contacts 90 and 91 are connected with one of terminals of the electro-magnet 63, the other terminal of the magnet being connected with the other one of the conductors 76.

It will now be apparent that when the contact arm 89 engages either one of the contacts 90 and 91, the electro-magnet 63 will be momentarily energized and the ratchet wheel, the drum, locking member 74 will be stepped up one step. It being assumed that the locking member 74 is in the retracted or unlocked position, and that one step is required to move it into locking position, the energizing of the solenoid by the engagement of the arm 89 with the contact 90 will cause the ratchet to be stepped up one step and therefore the locking member moved into locking position. It will remain in this position until the appropriate time having been reached, the contact arm 89 will engage with the contact 91 to make and break the circuit of the solenoid once when the ratchet wheel 65 will be stepped up one step and the locking member will be retracted into unlocking position. It will now be apparent that the set will be locked from the time when the contact arm 89 engages the contact 90 until it is again unlocked by engagement of that contact arm with the contact 91, and it will further be seen that the time and duration of the locking and unlocking may be adjusted by the contacts 90 and 91 respectively angularly about the shaft upon which the contact arm 89 is mounted. Thus if the contact 90 is adjusted to a position corresponding to 1 o'clock and the contact 91 is adjusted to a position corresponding to 4 o'clock, the set will be automatically locked by the clock-operated-contacting mechanism between the hours of 1 and 4, and will be unlocked and so capable of responding to failure of current in the supply mains at all other times.

While the invention has been illustrated in what are considered its best applications it may have other embodiments without departing from its spirit and is not, therefore, limited to the structures shown in the drawings.

What I claim is:

1. The combination with a fluid-pressure motor, of a valve controlling the supply of fluid to said motor, a circuit, run-down rotatable means responsive to voltage conditions in said circuit for opening said valve, means for holding said means against running down and means responsive to said voltage conditions for imparting a hammer blow to said holding means to release it and motive means for winding up said run-down means, a clutch for connecting and disconnecting said run-down means and motive means in driving relation, said run-down means, when released from said holding means, being free to makes its complete opening movement.

2. The combination with a fluid-pressure motor, of a valve controlling the supply of fluid to said motor, a circuit, rotatable run-down means responsive to voltage conditions in said circuit for opening said valve, a movable dog for holding said means against running down and means responsive to said voltage conditions for moving said dog out of holding position and motive means for closing said valve, a clutch for connecting and disconnecting said run-down means and motive means in driving relation, said run-down means, when released from said holding means, being free to make its complete opening movement.

3. The combination with a fluid-pressure motor, of a valve controlling the supply of fluid to said motor, a circuit, rotatable run-down means responsive to voltage conditions in said circuit for opening said valve, a movable dog for holding said means against running down and means responsive to said voltage conditions for moving said dog out of holding position and motive means for closing said valve and rewinding said run-down means, a clutch for connecting and disconnecting said run-down means and motive means in driving relation, said run-down means, when released from said holding means, being free to make its complete opening movement.

4. In an emergency electric generating set, the combination with a fluid pressure motor operatively connected in driving relation to said generator, a valve controlling the supply of fluid to said motor, a circuit, weight-actuated means responsive to current conditions in said circuit for operating said valve, electro-magnetic means in said circuit for initiating the action of said weight-actuated means in response to current failure in the said circuit, a solenoid operated mechanism in the said circuit operatively related to the said electro-magnetic means, a clock controlled switch for locking said electro-magnetic means for a predetermined period and means for locking and unlocking said electro-magnetic means at will.

5. The combination with a fluid-pressure motor, of a valve controlling the supply of fluid to said motor, a circuit, weight-actuated means including a drum responsive to voltage failure in said circuit for opening said valve, a movable dog for holding said means against operation and means responsive to said voltage conditions for moving said dog out of holding position, an electro-magnetic means connected in said circuit for winding up said weight and for closing said valve upon the resumption of voltage in said circuit.

6. The combination with a fluid-pressure motor, of a valve controlling the supply of fluid to said motor, a circuit, weight-actuated means including a drum responsive to voltage conditions in said circuit for opening said valve, a movable dog for holding said means against operation and means responsive to said voltage conditions for moving said dog out of holding position, electro-magnetic means for winding up said weight and for closing said valve, mechanical means for connecting said electro-motive means to said weight and switching means for connecting said electro-magnetic means with said circuit.

7. The combination with a fluid-pressure motor, of a valve controlling the supply of fluid to said motor, a circuit, a weight-actuated drum for opening said valve in response to voltage conditions in said circuit, an electric motor for winding up said weight and for closing said valve, a shaft operatively connected to said drum, a clutch for connecting said shaft to said electric motor and switching means responsive to the action of said drum for connecting said electric motor to said circuit.

8. The combination with a fluid-pressure motor, of a valve controlling the supply of fluid to said motor, a circuit, a weight-actuated drum for opening said valve in response to voltage failure in said circuit, an electric motor in said circuit for winding up said weight and for closing said valve on resumption of voltage in said circuit, a shaft operatively connected to said drum, a clutch for connecting said shaft to said electric motor, means controlled by said drum for opening said clutch and electro-magnetic means responsive to voltage failure in said circuit for locking said clutch in open position.

9. The combination with a fluid-pressure motor, of a valve controlling the supply of fluid to said motor, a circuit, weight-actuated means including a drum responsive to voltage failure in said circuit for opening said valve, an electric motor connected to said circuit for winding up said weight and closing said valve upon the resumption of voltage in said circuit, a clutch for connecting and disconnecting said motor in driving relation to said drum and a switch for connecting said motor to said circuit, said switch being operatively related to the valve-operating means.

10. In an emergency electric generating set, the combination with a fluid-pressure motor operatively connected in driving relation to said generator, a valve controlling the supply of fluid to said motor, a circuit, weight-actuated means responsive to current cnditions in said circuit for operating said valve, electro-magnetic means in said circuit for initiating the action of said weight-actuated means in response to current failure in the said circuit, means in the said circuit operatively related to the said electro-magnetic means including a clock controlled switch for automatically locking said electro-magnetic means for a predetermined period and unlocking it again at the end of the said period.

11. In an emergency electric generating set, the combination with a fluid-pressure motor operatively connected in driving relation to said generator, a valve controlling the supply of fluid to said motor, a circuit, weight-actuated means responsive to current conditions in said circuit for operating said valve, electro-magnetic means in said circuit for initiating the action of said weight-actuated means in response to current failure in the said circuit, means for automatically locking said initiating means for a predetermined period and unlocking said initiating means again at the end of the said period.

12. In an emergency electric generating set, the combination with a fluid-pressure motor operatively connected in driving relation to said generator, a valve controlling the supply of fluid to said motor, a circuit, weight-actuated means responsive to current conditions in said circuit for operating said valve, electro-magnetic means in said circuit for initiating the action of said weight-actuated means in response to current failure in the said circuit, a solenoid operated mechanism in the said circuit operatively related to the said electro-magnetic means and a clock controlled switch for locking said electro-magnetic means for a predetermined period.

13. The combination with a fluid-pressure motor, of a valve controlling the supply of fluid to said motor, said valve being rotatably mounted, a worm secured to said valve, stationary means engaging with said worm as said valve and worm are rotated, a drum operatively related to said worm and valve, a cable on said drum, a weight carried by said cable and operating in falling to turn said drum, valve stem and worm to move the valve to open position, a ratchet wheel operatively connected to said drum, a pawl engaging said ratchet wheel and restraining said drum from turning under the action of said weight, a circuit, a solenoid connected in said circuit, a weight controlled by said solenoid and engaging with said pawl to move it out of engagement with said ratchet, a motor, means for connecting said motor with said drum including gearing and a releasable clutch and switching mechanism for connecting and disconnecting said motor with said circuit, said drum engaging said switching mechanism to shift the same.

JOSEPH P. BRYAN.